United States Patent
Wang

(10) Patent No.: US 7,791,689 B2
(45) Date of Patent: Sep. 7, 2010

(54) LIQUID CRYSTAL DISPLAY WITH COLOR UNITS HAVING DIFFERENT WIDTH

(75) Inventor: Hua-Bin Wang, Shenzhen (CN)

(73) Assignees: Innocom Technology (Shenzhen) Co., Ltd., Shenzhen, Guangdong Province (CN); Chimei Innolux Corporation, Miao-Li County (TW)

(*) Notice: Subject to any disclaimer, the term of this patent is extended or adjusted under 35 U.S.C. 154(b) by 479 days.

(21) Appl. No.: 12/002,385

(22) Filed: Dec. 17, 2007

(65) Prior Publication Data

US 2008/0143936 A1    Jun. 19, 2008

(30) Foreign Application Priority Data

Dec. 15, 2006    (TW) .............................. 95147241 A

(51) Int. Cl.
G02F 1/1335    (2006.01)
G09G 3/36     (2006.01)

(52) U.S. Cl. ......................................... 349/106; 345/88

(58) Field of Classification Search ................ 349/106; 345/88; 343/46.3; 353/84; 438/70
See application file for complete search history.

(56) References Cited

U.S. PATENT DOCUMENTS

| | | | |
|---|---|---|---|
| 5,898,208 A | | 4/1999 | Miyazaki et al. |
| 6,124,909 A | * | 9/2000 | Miyashita et al. ........... 349/109 |
| 6,888,604 B2 | * | 5/2005 | Rho et al. ................... 349/146 |
| 7,256,855 B2 | * | 8/2007 | Baek .......................... 349/144 |
| 7,321,410 B2 | | 1/2008 | Iijima et al. |
| 2005/0083453 A1 | * | 4/2005 | Nakano et al. .............. 349/106 |

FOREIGN PATENT DOCUMENTS

| | | |
|---|---|---|
| CN | 1696778 A | 11/2005 |
| JP | 7-333594 A | 12/1995 |

* cited by examiner

Primary Examiner—Hoan C Nguyen
(74) Attorney, Agent, or Firm—Wei Te Chung

(57) ABSTRACT

An exemplary liquid crystal display (2) includes a liquid crystal panel (20), and a backlight module (22) located adjacent to the liquid crystal panel. The liquid crystal panel includes a first substrate assembly (24) and a second substrate assembly (26) parallel to the first substrate assembly. The second substrate assembly includes a color filter layer (262). The color filter layer includes red units, green units, and blue units. The red, green and blue units are approximately strip-shaped. A ratio of a width of each red unit to a width of each green unit is in direct proportion to a ratio of the wavelength of red light to the wavelength of green light. A ratio of the width of each green unit to a width of each blue unit is in inverse proportion to a ratio of the wavelength of green light to the wavelength of blue light.

20 Claims, 4 Drawing Sheets

LIQUID CRYSTAL DISPLAY WITH COLOR UNITS HAVING DIFFERENT WIDTH

FIELD OF THE INVENTION

The present invention relates liquid crystal displays (LCDs), and particularly to an LCD which includes a plurality of different colored color units having different widths.

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions. An LCD generally includes a liquid crystal panel, a driving circuit for driving the liquid crystal panel, and a backlight module for illuminating the liquid crystal panel.

Referring to FIG. 4, a typical LCD 1 includes a liquid crystal panel 10, and a backlight module 12 located adjacent to the liquid crystal panel 10. The liquid crystal panel 10 includes a first substrate assembly 14, a second substrate assembly 16 parallel to the first substrate assembly 14, and a liquid crystal layer 15 interposed between the first and second substrate assemblies 14, 16.

Referring also to FIG. 5, the first substrate assembly 14 includes a first substrate 141, a plurality of gate lines 142 that are parallel to each other and that each extend along a first direction, a plurality of data lines 143 that are parallel to each other and that each extend along a second direction orthogonal to the first direction, a plurality of thin film transistors (TFTs) 146 that function as switching elements, and a plurality of pixel electrodes 145. The gate lines 142 and data lines 143 cross each other, thereby defining an array of pixel units 144. The plurality of pixel electrodes 145 are formed in the pixel units 144 respectively. Each TFT 146 is provided in the vicinity of a respective point of intersection of the gate lines 142 and the data lines 143. A gate electrode 147, a source electrode 148, and a drain electrode 149 of the TFT 146 are connected to a corresponding gate line 142, a corresponding data line 143, and a corresponding pixel electrode 145 respectively.

Referring also to FIG. 6, the second substrate assembly 16 includes a second substrate 161 and a color filter layer 162 formed on the second substrate 161. The color filter layer 162 includes a plurality of color units 163 and a black matrix 164. The color units 163 include a plurality of red units (R), a plurality of green units (G), and a plurality of blue units (B). The red, green and blue units are alternately arranged on the second substrate 161, and each color unit 163 corresponds to a respective pixel electrode 145. The red, green and blue units are approximately strip-shaped, and have the same width. The black matrix 164 is formed between the red, green and blue units, thereby spacing the red, green and blue units from each other. The black matrix 164 is positioned corresponding to the gate lines 142, the data lines 143 and the TFTs 146 of the first substrate assembly 14.

The naked human eye can see light having a wavelength in the range from 390~780 nanometers, and can distinguish 120~180 colors including the seven primary colors: purple, blue, cyan, green, yellow, orange and red. When light enters the human eye, color perception occurs in the human brain. According to optical physics, red, green and blue colors can be mixed to generate white color or any other colors in the spectrum. Because the sensitiveness of the human eye to different colors is different, the red, green and blue units of the color filter layer 162 are perceived to have different widths when viewed by the human eye. This can impair the color effect of images displayed on the LCD 1 and viewed by a user.

What is needed, therefore, is a new LCD that can overcome the above-described deficiencies.

SUMMARY

In one preferred embodiment, a liquid crystal display includes a liquid crystal panel, and a backlight module located adjacent to the liquid crystal panel. The liquid crystal panel includes a first substrate assembly and a second substrate assembly parallel to the first substrate assembly. The second substrate assembly includes a color filter layer. The color filter layer includes a plurality of red units, a plurality of green units, and a plurality of blue units. The red, green and blue units are approximately strip-shaped. A ratio of a width of each red unit to a width of each green unit is in direct proportion to a ratio of the wavelength of red light to the wavelength of green light. A ratio of the width of each green unit to a width of each blue unit is in inverse proportion to a ratio of the wavelength of green light to the wavelength of blue light.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
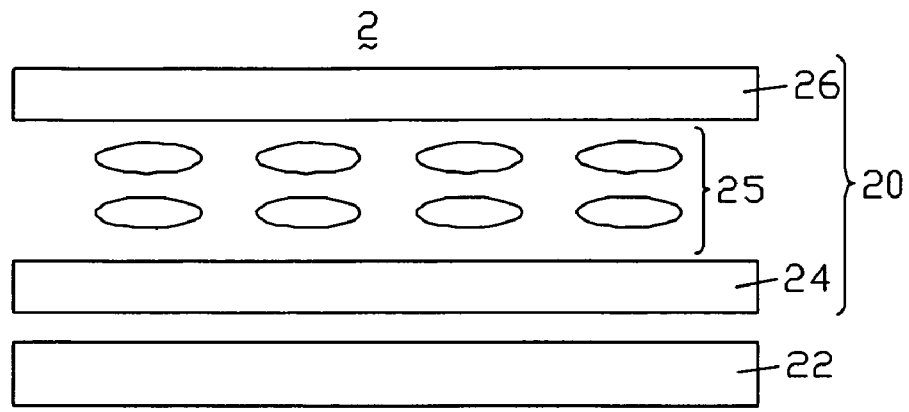
FIG. 1 is an exploded, side-on view of an LCD according to an exemplary embodiment of the present invention, the liquid crystal display including a liquid crystal panel, the liquid crystal panel including a first substrate assembly and a second substrate assembly.

Referring to FIG. 1, a typical LCD 2 includes a liquid crystal panel 10 and a backlight module 12 located adjacent to the liquid crystal panel 10. The liquid crystal panel 10 includes a first substrate assembly 14, a second substrate assembly 16 parallel to the first substrate assembly 14, and a liquid crystal layer 15 interposed between the first and second substrate assemblies 14, 16.

Figure 2:
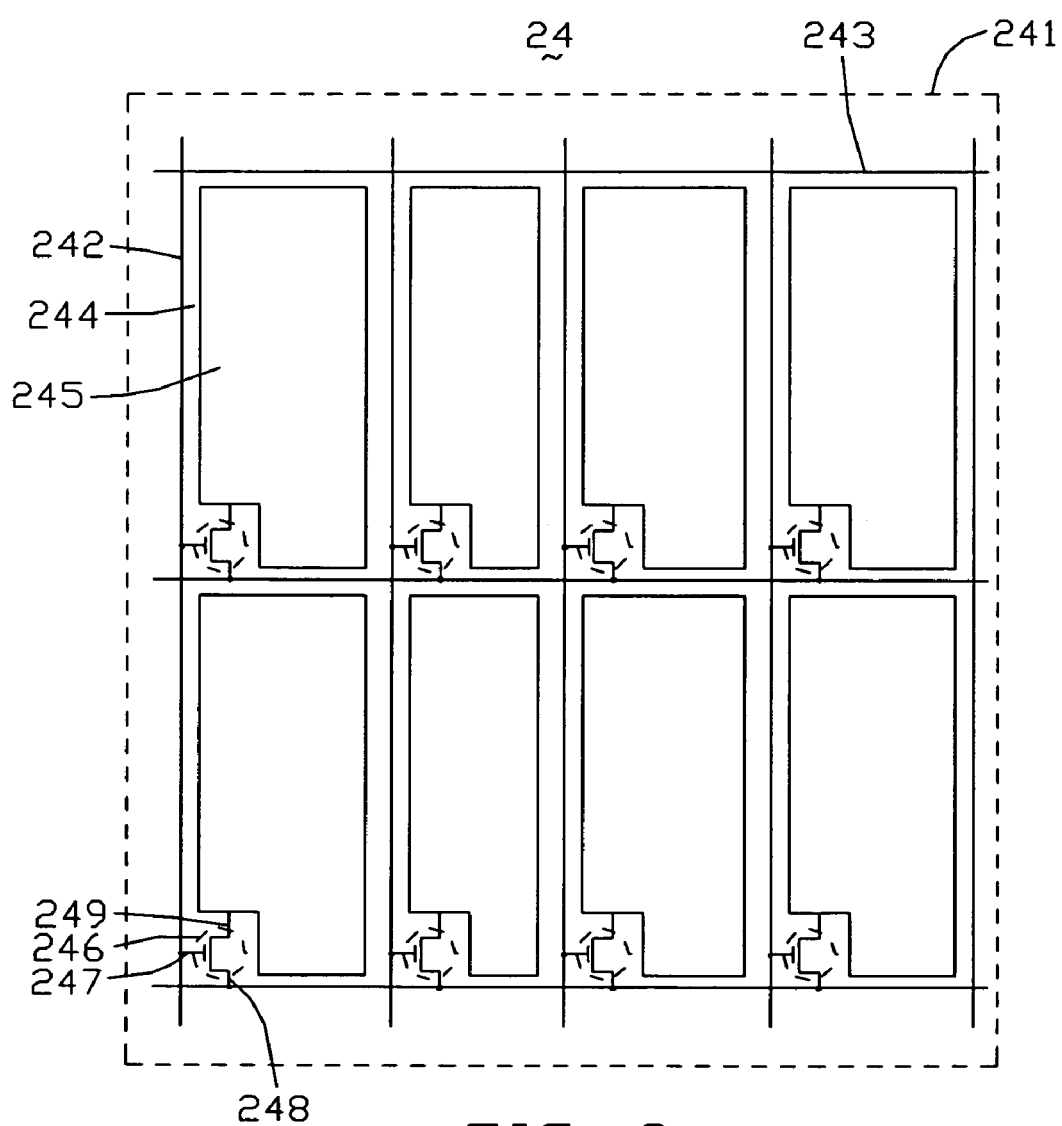
FIG. 2 is an enlarged, top plan view of part of the first substrate assembly of the liquid crystal display of FIG. 1.

Referring also to FIG. 2, the first substrate assembly 24 includes a first substrate 241, a plurality of gate lines 242 that are parallel to each other and that each extend along a first direction, a plurality of data lines 243 that are parallel to each other and that each extend along a second direction orthogonal to the first direction, a plurality of thin film transistors (TFTs) 246 that function as switching elements, and a plurality of pixel electrodes 245. The gate lines 242 and data lines 243 cross each other, thereby defining an array of pixel units 244. The plurality of pixel electrodes 245 are formed in the pixel units 244 respectively. Each TFT 246 is provided in the vicinity of a respective point of intersection of the gate lines 242 and the data lines 243. A gate electrode 247, a source electrode 248, and a drain electrode 249 of the TFT 246 are connected to a corresponding gate line 242, a corresponding data line 243, and a corresponding pixel electrode 245 respectively. The first substrate 241 can be made from glass or quartz.

Figure 3:
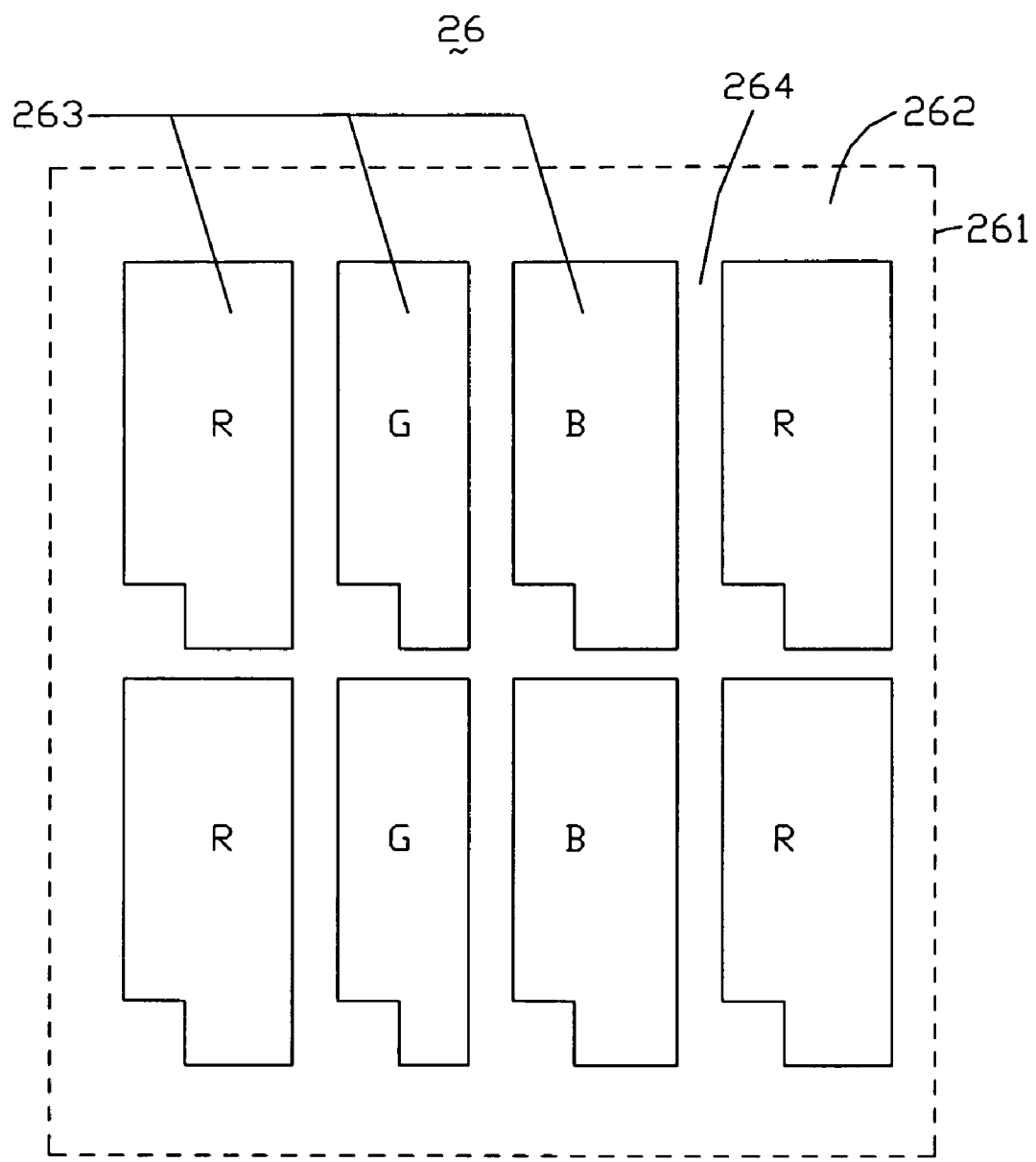
FIG. 3 is an enlarged, top plan view of part of the second substrate assembly of the liquid crystal display of FIG. 1, corresponding to the part of the first substrate assembly shown in FIG. 2.
Figure 4:
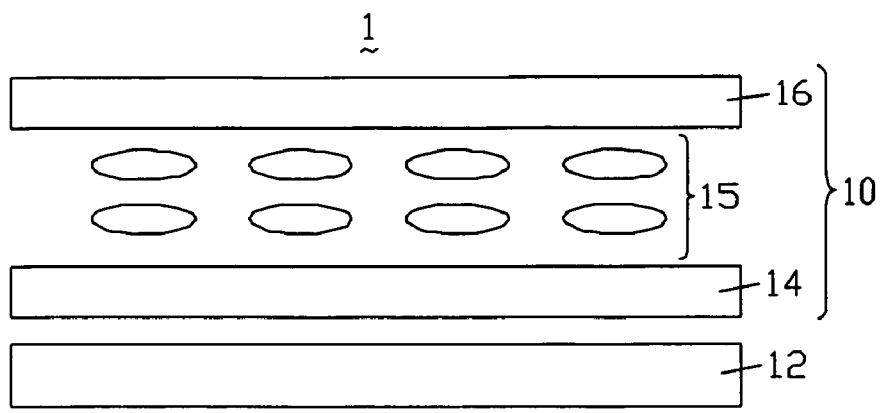
FIG. 4 is an exploded, side-on view of a conventional LCD, the liquid crystal display including a liquid crystal panel, the liquid crystal panel including a first substrate assembly and a second substrate assembly.
Figure 5:
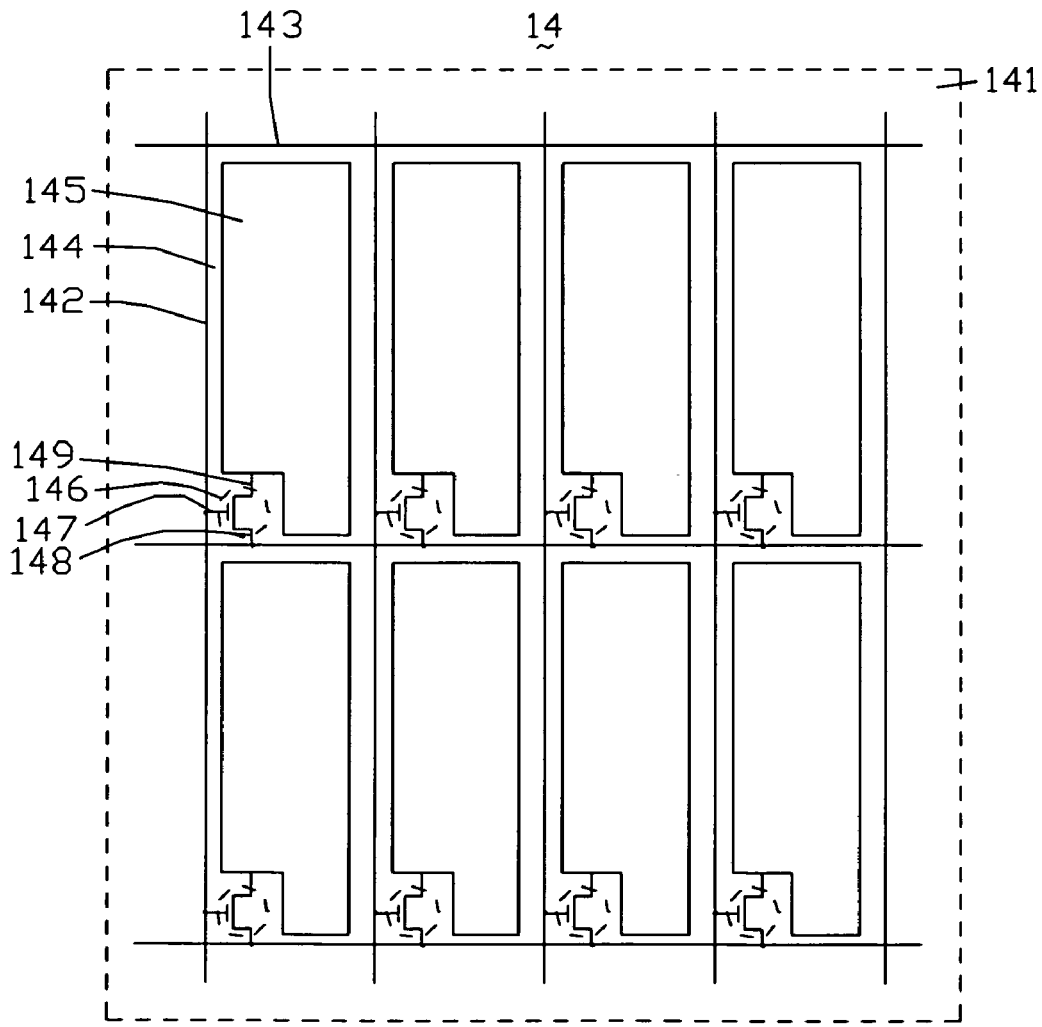
FIG. 5 is an enlarged, top plan view of part of the first substrate assembly of the liquid crystal display of FIG. 4.
Figure 6:
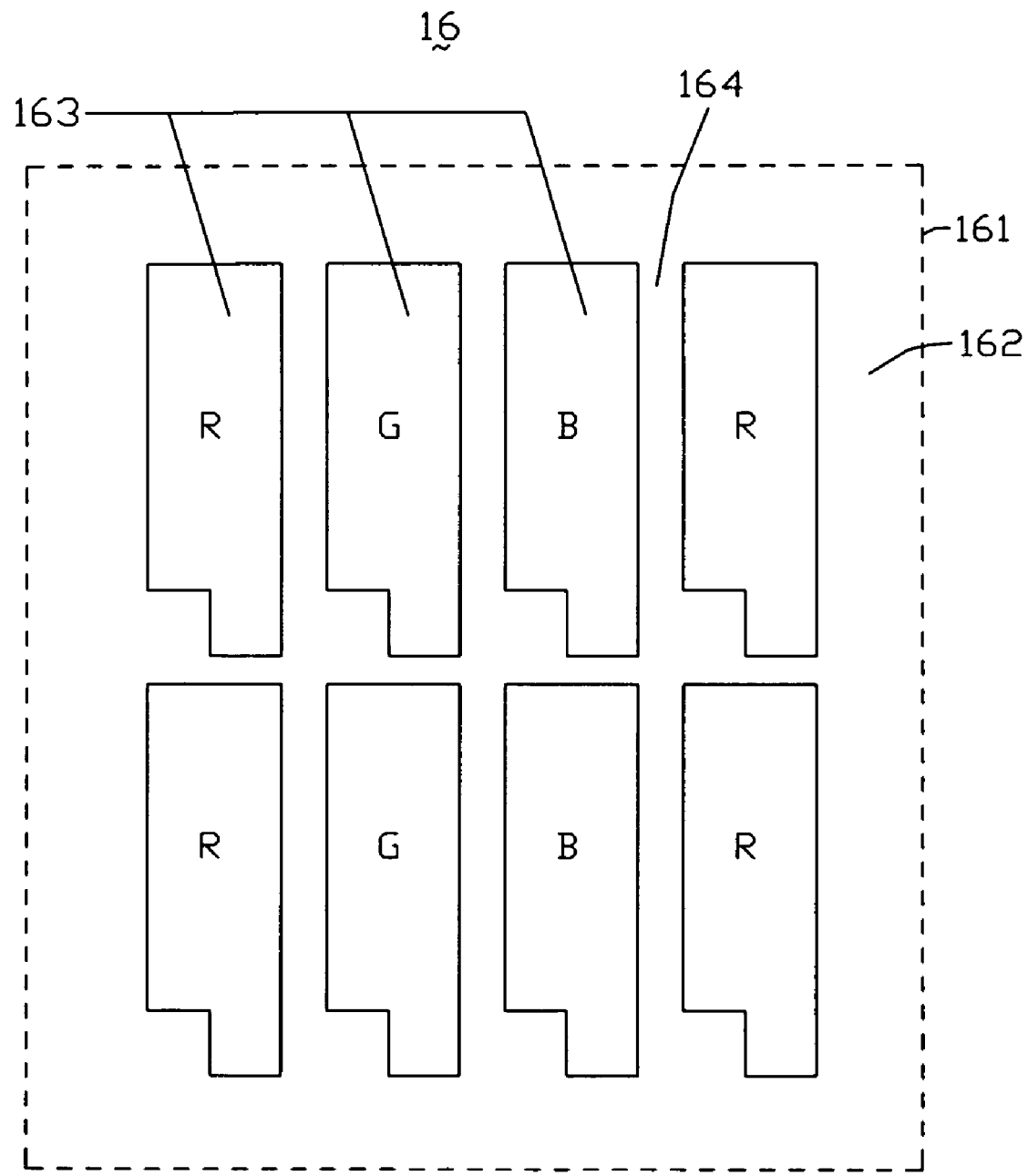
FIG. 6 is an enlarged, top plan view of part of the second substrate assembly of the liquid crystal display of FIG. 4, corresponding to the part of the first substrate assembly shown in FIG. 5.

Referring also to FIG. 3, the second substrate assembly 26 includes a second substrate 261 and a color filter layer 262 formed on the second substrate 261. The color filter layer 262 includes a plurality of color units 263 and a black matrix 264. The color units 263 include a plurality of red units (R), a plurality of green units (G), and a plurality of blue units (B). The red, green and blue units are arranged on the second substrate 261 in a predetermined pattern, and each color unit 263 corresponds to a respective pixel electrode 245. The black matrix 264 is formed between the red, green and blue units, thereby spacing the red, green and blue units from each other. The black matrix 264 is positioned corresponding to the gate lines 242, the data lines 243, and the TFTs 246 of the first substrate assembly 24. The second substrate 261 can be made from glass or quartz.

The red, green and blue units are approximately stripshaped. Each color unit 263 includes two opposite, straight, long sides. All the contour lines of each color unit 263 are straight. In the illustrated embodiment, each color unit 263 is rectangular except for a cutout defined at one end, the cutout corresponding to the respective TFT 246. The red units, the green units and the blue units have different widths. A ratio of a width of each red unit to a width of each green unit is in direct proportion to a ratio of the wavelength of red light to the wavelength of green light. A ratio of the width of each green unit to a width of each blue unit is in inverse proportion to a ratio of the wavelength of green light to the wavelength of blue light. A wavelength of red light emitted from a red material (pigment) of the red units is approximately equal to 700 nanometers. A wavelength of green light emitted from a green material (pigment) of the green units is approximately equal to 546.1 nanometers. A wavelength of light emitted from a blue material (pigment) of the blue units is approximately equal to 435.8 nanometers. Thus, a ratio of a width of each red unit to a width of each green unit and to a width of each blue unit is approximately 1.28:1:1.25. In practical applications, a tolerance of the above three-color width ratio must be equal to or less than 1%.

In summary, the red units, the green units, and the blue units are have different widths from each other. This configuration compensates for the different sensitiveness of the human eye to red, green and blue colors and the different wavelengths of red, green and blue light. Therefore the red, green and blue units have substantially the same visual width as perceived by the human eye. This can improve the color effect of images displayed on the liquid crystal display 2 and viewed by a user. That is, the liquid crystal display 2 has improved color performance.

In an alternative embodiments, each of the red, green and blue units can include curved contour lines.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display comprising:
   a liquid crystal panel; and
   a backlight module located adjacent to the liquid crystal panel;
   wherein the liquid crystal panel comprises:
      a first substrate assembly; and
      a second substrate assembly parallel to the first substrate assembly, the second substrate assembly comprising a color filter layer, the color filter layer comprising a plurality of red units, a plurality of green units, and a plurality of blue units, the red, green and blue units being approximately strip-shaped, a ratio of a width of each red unit to a width of each green unit being in direct proportion to a ratio of the wavelength of red light to the wavelength of green light, and a ratio of the width of each green unit to a width of each blue unit being in inverse proportion to a ratio of the wavelength of green light to the wavelength of blue light.

2. The liquid crystal display as claimed in claim 1, wherein a wavelength of red light emitted from a red material of the red units is approximately equal to 700 nanometers, a wavelength of green light emitted from a green material of the green units is approximately equal to 546.1 nanometers, and a wavelength of blue light emitted from a blue material of the blue units is approximately equal to 435.8 nanometers.

3. The liquid crystal display as claimed in claim 2, wherein a ratio of the width of each red unit to the width of each green unit and to the width of each blue unit is approximately 1.28:1:1.25.

4. The liquid crystal display as claimed in claim 1, wherein each of the red, green and blue units includes straight contour lines.

5. The liquid crystal display as claimed in claim 1, wherein each of the red, green and blue units includes curved contour lines.

6. The liquid crystal display as claimed in claim 1, wherein the first substrate assembly comprises a first substrate, a plurality of gate lines that are parallel to each other and that each extend along a first direction, a plurality of data lines that are parallel to each other and that each extend along a second direction orthogonal to the first direction, a plurality of thin film transistors (TFTs) that function as switching elements, and a plurality of pixel electrodes.

7. The liquid crystal display as claimed in claim 6, wherein the gate lines and data lines cross each other, thereby defining an array of pixel units, the pixel electrodes being provided in the pixel units respectively.

8. The liquid crystal display as claimed in claim 7, wherein each TFT is provided in the vicinity of a respective point of intersection of the gate lines and the data lines.

9. The liquid crystal display as claimed in claim 6, wherein a gate electrode, a source electrode, and a drain electrode of each TFT are connected to a corresponding gate line, a corresponding data line, and a corresponding pixel electrode respectively.

10. The liquid crystal display as claimed in claim 6, wherein the second substrate assembly further comprises a second substrate, the color filter layer being formed at the second substrate.

11. The liquid crystal display as claimed in claim 10, wherein the first and second substrates are made from glass or quartz.

12. The liquid crystal display as claimed in claim 10, wherein the color filter layer further comprises a black matrix formed between the red, green and blue units, thereby spacing the red, green and blue units from each other.

13. The liquid crystal display as claimed in claim 12, wherein the black matrix is positioned corresponding to the gate lines, the data lines and the TFTs of the first substrate assembly.

14. A liquid crystal display comprising:
a liquid crystal panel; and
a backlight module located adjacent to the liquid crystal panel;
wherein the liquid crystal panel comprises:
a first substrate;
a second substrate parallel to the first substrate; and
a color filter layer provided at an inner side of the second substrate, the color filter layer comprising a plurality of color units having different colors, the different colored color units having different physical widths according to different sensitiveness of the human eye to each of the different colors and different wavelengths of each of the different colors, such that the color units have substantially the same visual width as perceived by the human eye.

15. The liquid crystal display as claimed in claim 14, wherein the different colors include red, green, and blue.

16. The liquid crystal display as claimed in claim 15, wherein a wavelength of red light emitted from a red material of the red units is approximately equal to 700 nanometers, a wavelength of green light emitted from a green material of the green units is approximately equal to 546.1 nanometers, and a wavelength of blue light emitted from a blue material of the blue units is approximately equal to 435.8 nanometers.

17. The liquid crystal display as claimed in claim 16, wherein a ratio of the width of each red unit to the width of each green unit and to the width of each blue unit is approximately 1.28:1:1.25.

18. The liquid crystal display as claimed in claim 15, wherein the second substrate assembly further comprises a second substrate, the color filter layer being formed at the second substrate.

19. The liquid crystal display as claimed in claim 18, wherein the color filter layer further comprises a black matrix formed between the red, green and blue units, thereby spacing the red, green and blue units from each other.

20. A liquid crystal display comprising:
a liquid crystal panel; and
a backlight module located adjacent to the liquid crystal panel;
wherein the liquid crystal panel comprises:
a first substrate;
a second substrate parallel to the first substrate; and
a color filter layer provided at an inner side of the second substrate, the color filter layer comprising three groups of color units having three different colors thereof, at least two groups of color units having different physical widths with each other, wherein
said different widths are dimensioned according to a ratio between wavelengths of said two different colors of said two groups of color units.

* * * * *